United States Patent [19]
Ueyama et al.

[11] Patent Number: 5,172,276
[45] Date of Patent: Dec. 15, 1992

[54] STRUCTURE FOR STABILIZING IMAGE IN OPTICAL SYSTEM

[75] Inventors: Masayuki Ueyama, Toyonaka; Tougo Teramoto, Wakayama; Shinichi Suzuki, Izumiotsu; Masaaki Miyano, Sakai, all of Japan

[73] Assignee: Minolta Camera Kabushiki Kaisha, Osaka, Japan

[21] Appl. No.: 574,645

[22] Filed: Aug. 29, 1990

[30] Foreign Application Priority Data

| Aug. 29, 1989 | [JP] | Japan | 1-222655 |
| Aug. 29, 1989 | [JP] | Japan | 1-222656 |
| Aug. 29, 1989 | [JP] | Japan | 1-222657 |
| Sep. 25, 1989 | [JP] | Japan | 1-248671 |
| Sep. 25, 1989 | [JP] | Japan | 1-248672 |

[51] Int. Cl.$^5$ .............................. G02B 7/02
[52] U.S. Cl. .................... 359/813; 359/697; 359/700
[58] Field of Search ............ 359/813, 819, 823, 694, 359/814, 824, 825, 677, 676, 695, 696, 699, 700, 697; 354/195.12, 286; 369/43, 44.11

[56] References Cited

U.S. PATENT DOCUMENTS

| 4,302,830 | 11/1981 | Makaoka et al. | 359/813 |
| 4,386,823 | 6/1983 | Musha | 359/813 |
| 4,419,614 | 12/1983 | Kimura | 359/813 |
| 4,788,596 | 11/1988 | Kawakami et al. | 358/222 |

FOREIGN PATENT DOCUMENTS

| 54-115943 | 8/1979 | Japan. |
| 55-7568 | 2/1980 | Japan. |
| 56-14226 | 2/1981 | Japan. |
| 63-155038 | 6/1988 | Japan. |
| 63-201622 | 8/1988 | Japan. |

Primary Examiner—Loha Ben
Attorney, Agent, or Firm—Price, Gess & Ubell

[57] ABSTRACT

A structure for preventing an image being shaken when a vibration occurs in an optical system so as to stabilize the object. A compensating lens is incorporated in a third lens group of a lens barrel constituting the optical system. The compensating lens is allowed to move within the third lens group and only in a direction perpendicular to the optical axis. A pulse motor mounted on a fixed barrel drives the compensating lens. The rotation of the pulse motor is converted into the rotation of an interlocking lever. The interlocking lever is a straight bar having an uncircular sectional configuration. A driving lever having approximately the same configuration as the sectional configuration of the interlocking lever is slidably inserted thereinto. The driving lever rotates together with the interlocking lever. One end of the driving lever penetrates through the frame of the third lens group, thus contacting the head portion of a pin which presses the compensating lens. When the driving lever rotates, the compensating lens is pressed through the pin. At a position opposed to the pin, a plate urged by a leaf spring supports the compensating lens. A mechanism for driving the compensating lens is provided in x-direction and y-direction with respect to the compensating lens. When the driving lever rotates in the opposite direction, the compensating lens is moved to the initial position by the elastic force of the leaf spring.

20 Claims, 15 Drawing Sheets

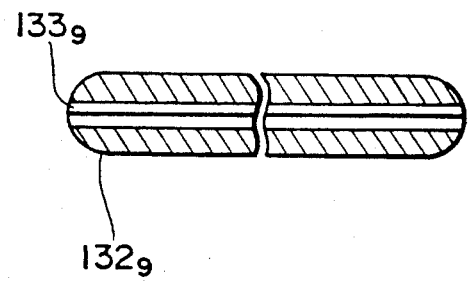
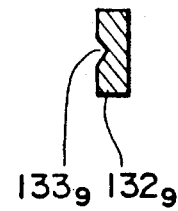
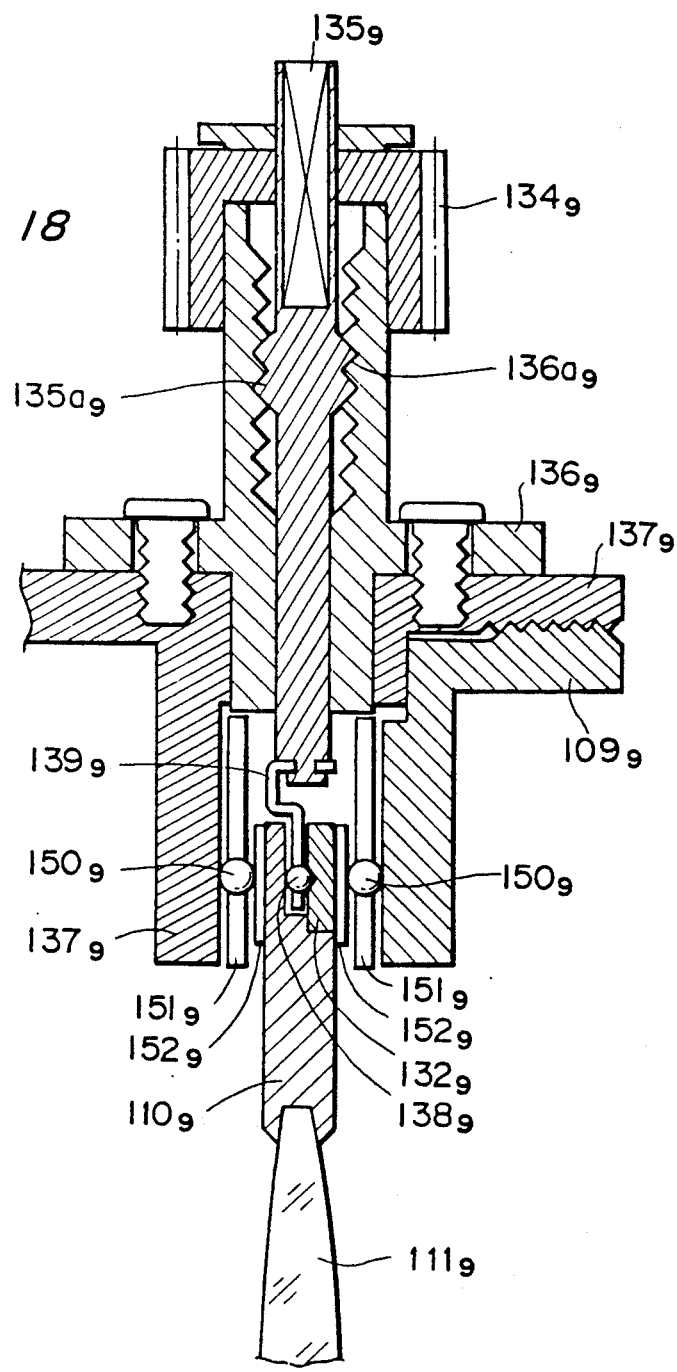

STRUCTURE FOR STABILIZING IMAGE IN OPTICAL SYSTEM

BACKGROUND OF THE INVENTION

1. Field of the Invention

The present invention relates to a structure for stabilizing an object image in an optical system, and more particularly, to the structure for stabilizing the image in the optical system having a compensating lens movable in a surface intersecting an optical axis of the system so as to compensate an image blurred by such as a camera-shake.

2. Description of the Related Art

According to a known structure, a part of lenses, of a photographing optical system mounted in a lens barrel, serving as a lens for compensating an image blurred by such as a camera-shake is moved in a direction perpendicular to the optical axis of the system. Thus, an image shake is compensated or restrained to stabilize an image. Generally, a lens barrel having such a structure is called a shake compensating lens barrel. When a zooming or focusing operation is carried out by the shake compensating lens barrel, it is necessary to move the compensating lens together with other lenses along the optical axis. According to a known shake compensating lens barrel, a mechanism including a motor for perpendicularly driving the compensating lens is mounted on the frame which moves along the optical axis thereby moving the compensating lens therewith for the zooming or focusing so that the mechanism for perpendicularly driving the compensating lens can be adopted in a zooming or focusing mechanism including a driving system which moves the lenses composing the photographing optical system along the optical axis of the system.

The mounting of the compensating lens driving mechanism on the compensating lens moving frame does not unfavorably optically affect the zooming or focusing operation of the photographing optical system, but the load of the driving system for the photographing optical system becomes great because the compensating lens and the compensating lens driving mechanism are moved together by the driving system. In particular, in an automatic focusing camera, the load of a focusing driving motor becomes great, with the result that the response speed of a focusing operation becomes slow.

In the compensating lens driving mechanism of such a shake compensating lens barrel, a gear mechanism such as a reduction gear is included in a driving force transmitting system disposed between the driving motor and the compensating lens. The backlash of each gear of the gear mechanism has an unfavorable influence on the operation accuracy of the compensating lens driving mechanism. Thus, a compensating operation cannot be preferably accomplished.

A small driving load of the movement of the compensating lens along the optical axis means that in a zooming or a focusing operation the movement of the compensating lens is light and the response of the photographing optical system is eventually quick. To reduce the driving load, it is necessary to reduce the weights of the compensating lens unit including the components of the mechanism for perpendicularly driving the compensating lens. For example, plastics are preferably used as the material of various components of the lens unit. However, plastic materials are not so resistant to abrasion. Further, the driving mechanism of the compensating lens has members which repeatedly slide at high speed. If plastic materials are adopted in such members, the members reduce the accuracy of the compensating operation in a short period. Thus, it is hard to adopt plastics as the material of these members.

SUMMARY OF THE INVENTION

Accordingly, it is an object of the present invention to provide a structure for stabilizing an image for use in an optical system in which a compensating lens moves due to the movement of a zooming mechanism or a focusing mechanism, but a mechanism for driving the compensating lens does not move together with the compensating lens, whereby a driving load in a zooming or focusing operation is reduced and as such, the movement of the compensating lens is light.

It is another object of the present invention to provide a structure for stabilizing an image for use in an optical system which eliminates the influence of a backlash of a gear mechanism and the operation of a driving mechanism is effectively utilized to operate a compensating lens, whereby the compensating lens is capable of performing its operation with a high accuracy.

It is still another object of the present invention to provide a structure for stabilizing an image for use in an optical system which enables the use of a light weight material such as a plastic as the material of the compensating lens driving mechanism so that the compensating lens driving mechanism is compact and not susceptible to abrasion, and the compensating lens can favorably follow the movement of the compensating lens driving mechanism, whereby the compensating lens is capable of performing its operation with a high accuracy.

It is a further object of the present invention to provide a structure for stabilizing an image for use in an optical system having a mechanism for driving a compensating lens of a simple construction.

It is a still further object of the present invention to provide a structure for stabilizing an image for use in an optical system which allows a compensating lens to follow a high speed operation of a mechanism for driving the compensating lens.

A structure for stabilizing an image for use in an optical system according to an embodiment comprises: a lens unit movably provided in the optical system; a first member stationarily provided in the optical system; a second member, provided in the optical system, for holding the lens unit at its neutral position and allowing the lens unit to move in two different directions within a surface intersecting an optical axis of the optical system; and producing means, provided on the first member, for producing a power for driving the lens unit in the two directions in response to a detection of a vibration of the optical system.

The structure may include a transmitting means for transmitting driving force from the producing means to the lens unit. The transmitting means may include means for permitting the second member to move along the optical axis while transmitting the driving force from the producing means to the lens unit. Owing to this construction, the second member is movable along the optical axis with respect to the first member. The structure may include urging means for urging the lens unit in a direction opposite to the direction in which the driving force acts so that the lens unit returns to the neutral position. Preferably, the surface intersecting the optical axis is a flat plane perpendicular to the optical axis. Preferably, the structure includes means, provided in the lens unit, for allowing the movement of the lens unit in two different directions independently of each other.

According to the structure described above, since the second member holding the lens unit is movable in two different directions in a plane intersecting the optical axis of the optical system, the lens unit movable in the optical system is capable of moving in two different directions in the plane intersecting the optical axis of the optical system. That is, if the optical system is subjected to a vibration which causes an image to be blurred, the lens unit is capable of moving to a position in the plane intersecting the optical axis so that it can stabilize the image. The lens unit is driven by the resultant vector of driving forces in two different directions generated by the producing means in response to the detected vibration of the optical system. A photographing lens such as an optical system has at least a focusing function and some optical systems have a zooming function as well as the focusing function. These functions can be operated by moving lens groups of the optical system along the optical axis. Both a manual and an automatic mechanism is required to drive the lens groups. According to this embodiment, the producing means is mounted on the first member fixed to the optical system. Therefore, even though the lens unit moves along the optical axis as a result of a zooming operation or a focusing operation, the producing means does not move. That is, since a driving force for performing a zooming or a focusing operation is reduced in a quantity corresponding to force for moving the producing means which is not required to be moved, the lens unit can be moved with a small driving force. In other words, for example, the optical system can promptly respond to an operation for an automatic zooming operation or an automatic focusing operation.

A structure for stabilizing an image for use in an optical system according to another preferred embodiment comprises: a lens unit movably provided in the optical system; first urging means for urging the lens unit in one direction intersecting an optical axis of the optical system; second urging means for urging the lens unit in another direction intersecting the optical axis; first guiding means for guiding the movement of the lens unit in the one direction; second guiding means for guiding the movement of the lens unit in another direction; first biasing means for depressing the lens unit against the urging force of the first urging means in response to a detection of a vibration of the optical system; second biasing means for depressing the lens unit against the urging force of the second urging means in response to a detection of a vibration of the optical system; and means, provided in the lens unit, for allowing the movement of the lens unit in the two directions independently of each other.

Preferably, the allowing means includes a first driven surface elongated along one direction and depressed by the second depressing means and a second driven surface elongated along another direction and depressed by the first depressing means. The structure may further include means for restricting the movement of the lens in a direction along the optical axis.

According to the above structure, the movement of the lens unit is guided by both the first guiding means and the second guiding means and is allowed by the allowing means provided in the lens unit. The lens unit is guided in two different directions intersecting the optical axis of the optical system. Accordingly, when the optical system is vibrated so that an object image is blurred, the lens unit is capable of moving to a position in a plane intersecting the optical axis so as to stabilize the image. The movement of the lens unit is accomplished by a depressing force obtained by the first and second depressing means and an urging force obtained by the first and second urging means provided at a position respectively opposite to the first and second depressing means. Each depressing means depresses the lens unit in response to the detection of the vibration of the optical system. The lens unit is held by the depressing means and the urging means while each depressing means and urging means opposed to each other are always exerting force each other. Therefore, even though a gear mechanism having a backlash is included in a driving force transmitting system which applies driving force to the depressing means, to urging force always acts on the gears in one direction when the gears engage with each other. As such, a chatter or a play is not generated in the driving force transmitting system. That is, the operation amount of the driving mechanism including the depressing means is completely converted into the operation amount of the lens unit, so that an image can be stabilized with a high accuracy.

A structure for stabilizing an image for use in an optical system in still another embodiment comprises: a lens unit movably provided in the optical system; and driving means for driving the lens unit in response to a detection of a vibration of the optical system. In this structure, the lens unit is made of a light weight material.

Preferably, the light weight material is a plastic. It is preferable that the structure further comprises supporting means for allowing and supporting the lens unit and that the supporting means includes means for smoothing the movement of the lens unit. The smoothing means includes a guiding plate made of a metal and a metal ball rolling on the surface of the plate.

According to the above structure, an image is stabilized by driving the lens unit in response to the detection of the vibration of the optical system. The driving load becomes small because the lens unit is made of a light weight material. In particular, the operation of the weight-reduced lens unit is smooth and performed at a high speed because the supporting means includes means for smoothing the movement of the lens unit.

A structure for stabilizing an image for use in an optical system according to a further preferred embodiment comprises: a structure for stabilizing an image for use in an optical system having a lens unit movably provided in the optical system; a supporting member, movably provided in the optical system in a direction along an optical axis of the optical system, for movably supporting the lens unit in a direction intersecting the optical axis; and a mechanism, provided on the supporting member, for moving the lens unit in response to a detection of a vibration of the optical system.

According to the above structure, since the lens unit movable for stabilizing an image and the supporting means which moves along the optical axis in a zooming or a focusing operation operate independently of each other, both a mechanism for driving the former and that for driving the latter can be simplified in construction. Further, since the driving mechanism for operating the lens unit is mounted on the supporting member, the driving mechanism moves along the optical axis together with the supporting member. That is, it is unnecessary for the driving mechanism to perform an operation for moving along the optical axis for itself. Thus, the structure of the driving mechanism of the lens unit is simple because the driving mechanism is required to have only a structure for stabilizing an image.

A structure for stabilizing an image for use in an optical system according to a still further preferred embodiment comprises: a lens unit movably provided in the optical system; means for restricting a movement of the lens unit in a direction along an optical axis of the optical system; a supporting member, provided in the optical system, for movably supporting the lens unit in a direction perpendicular to the optical axis; producing means, provided in the optical system, for producing a power for driving the lens unit in response to a detection of a vibration of the optical system; and a transmitting mechanism for transmitting the driving power from the producing means to the lens unit so as to shift the lens unit in the direction perpendicular to the optical axis.

According to the above structure, since the lens unit is supported by the supporting means so that it can move in a direction perpendicular to the optical axis and the movement thereof along the optical axis is restricted by the restricting means, the lens unit is capable of moving in only a plane perpendicular to the optical axis. Driving force for moving the lens unit is outputted from the producing means in response to the detection of the vibration of the optical system. The driving force is transmitted from the producing means to the lens unit by the transmitting means so as to shift the lens unit in a direction perpendicular to the optical axis. Accordingly, the lens unit is pushed or pulled by the producing means through the transmitting means. In other words, the producing means and the lens unit operate as though both were integrated with each other through the transmitting means. Thus, the lens unit is capable of favorably following the operation of the producing means.

A structure for stabilizing an image for use in an optical system according to another preferred embodiment comprises: a lens unit movably provided in the optical system; a holding member for movably holding the lens unit; first urging member, provided on the holding member, for urging the lens unit in one direction intersecting an optical axis of the optical system; second urging member, provided on the holding member, for urging the lens unit in another direction intersecting the optical axis; first guiding means for guiding the movement of the lens unit in the one direction; second guiding means for guiding the movement of the lens unit in another direction; first depressing means for depressing the lens unit against the urging force of the first urging means in response to a detection of a vibration of the optical system; and second depressing means for depressing the lens unit against the urging force of the second urging means in response to a detection of a vibration of the optical system.

Preferably, the structure further comprises means for allowing the movement of the lens unit in two directions independently of each other. It is preferable that the allowing means includes a first driven surface elongated along one direction and depressed by the second depressing means and a second driven surface elongated along another direction and depressed by the first depressing means. The structure may further comprise means for restricting the movement of the lens in a direction along the optical axis.

According to the above structure, since the movement of the lens unit is guided by the first and second guiding means while it is held by the holding member. The lens unit is guided in two different directions intersecting the optical axis of the optical system. Accordingly, when the optical system is vibrated so that an image is blurred, the lens unit is capable of moving to a position in the plane intersecting the optical axis so as to stabilize the image. The movement of the lens unit is accomplished by a depressing force obtained by the first and second depressing means and an urging force obtained by each of the holding members provided at a position respectively opposite to the first and second depressing means. Each depressing means depresses the lens unit in response to the detection of the vibration of the optical system. The lens unit is held by the depressing means and the urging means while each depressing means and urging means opposed to each other are exerting force towards each other. Therefore, even though a gear mechanism having a backlash is included in a driving force transmitting system which applies driving force to the depressing means, an urging force always acts on the gears in one direction when the gears engage with each other. As such, a chatter or a play is not generated in the driving force transmitting system. That is, the operation amount of the driving mechanism including the depressing means is completely converted into the operation amount of the lens unit, so that an image can be stabilized with a high accuracy.

BRIEF DESCRIPTION OF THE DRAWINGS

These and other objects and features of the present invention will become apparent from the following description taken in conjunction with the preferred embodiments thereof with reference to the accompanying drawings, in which:

FIG. 18 is a front view showing a screw type vibration compensating driving mechanism according to a ninth embodiment of the present invention;

FIG. 19A is a front view showing a guide plate used in the ninth embodiment of the present invention shown in FIG. 18;

FIG. 19B is a side elevational view of the guide plate shown in FIG. 19A;

DETAILED DESCRIPTION OF THE INVENTION

Figure 1:
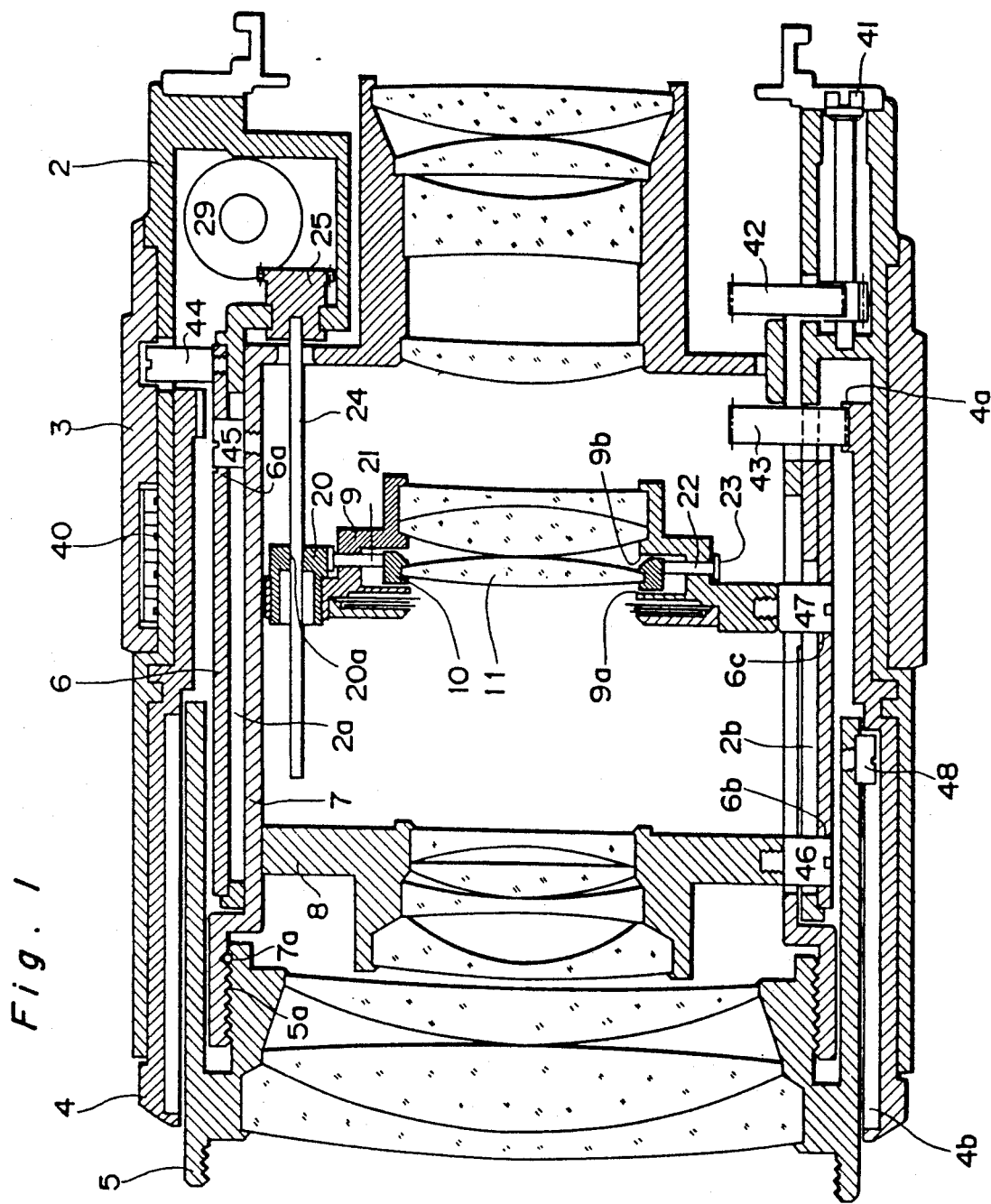
FIG. 1 is a vertical sectional view showing a structure for stabilizing an image for use in an optical system according to a first embodiment of the present invention.

Before the description of the present invention proceeds, it is to be noted that like parts are designated by like reference numerals throughout the accompanying drawings.

A zooming mechanism of a first embodiment shown in FIG. 1 is described below. The rotation of a zoom operation ring 3 which forms the periphery of a lens barrel is transmitted to a zoom cam ring 6 through a guide pin engaging the operation ring 3. As a result, the zoom cam ring 6 is rotated. A spiral cam groove 6a is formed on the zoom cam ring 6. A fixed barrel 2 has a rectilinear groove 2a formed along the optical axis and penetrating therethrough in the thickness direction thereof. A moving frame 7 for moving first and fourth lens groups is disposed on the inner periphery of the fixed barrel 2. The moving frame 7 has in the periphery thereof a guide pin 45 projecting radially therefrom, penetrating through the rectilinear groove 2a of the fixed barrel 2, and engaging the cam groove 6a of the zoom cam ring 6. Accordingly, when the zoom cam ring 6 rotates, the frame 7 rectilinearly moves along the optical axis. According to the same mechanism, a moving frame 8 for moving a second lens group and a holding frame 9 for holding a third lens group, namely, a compensating lens group rectilinearly move along the optical axis. Reference numeral 2b denotes a rectilinear groove formed on the fixed barrel 2. Reference numerals 6b and 6c designate cam grooves of the zoom cam ring 6. Reference numeral 46 indicates a guide pin projecting from the frame 8 for moving the second lens group and engaging the cam groove 6b. Reference numeral 47 denotes a guide pin projecting from the frame 9 and engaging the cam groove 6c. With the rectilinear movements of the frames 7, 8, and 9, a rectangular opening 20a guides a driving lever 20 (refer to FIG. 2) relative to an interlocking lever 24 to slide along the optical axis while both are rotating in the same direction without preventing the frame 9 from moving along the optical axis. The driving lever 20 and the interlocking lever 24 are described later.

Next, the focusing mechanism of the first embodiment is described in the case of an automatic focusing (AF) operation. An AF coupler 41 is rotated by driving force transmitted from the camera body. The rotation of the coupler 41 allows the rotation of a focus operation ring 4 while the rotation speed of the coupler 41 is reduced by AF gears 42 and 43 and an inner gear 4a of the focus operation ring 4. A rectilinear groove 4b is formed along the optical axis in approximately the front half of the inner peripheral surface of the focus operation ring 4. A frame 5 for supporting a focusing lens is disposed adjacent to the inner periphery of the focusing operation ring 4. A guide pin 48 projects from the peripheral surface of the frame 5 and engages the rectilinear groove 4b of the focus operation ring 4. Accordingly, the rotational force of the focus operation ring 4 is transmitted to the frame 5. Consequently, the frame 5 rotates together with the operation ring 4 while the movement of the frame 5 with respect to the operation ring 4 is allowed to move along the optical axis. As shown in FIG. 1, since a screw portion 5a of the frame 5 and a screw portion 7a of the frame 7 for moving the first and fourth lens groups engage each other, the frame 5 moves rectilinearly with respect to the frame 7 while the frame 5 is rotating. With a forward or a backward movement of the frame 5, a focusing operation is carried out. When a manual focusing operation is performed, the focusing mode is switched from the automatic focusing mode to the manual focusing mode. As a result, the driving force transmitting system (not shown) for transmitting the driving force of the driving source of the camera body to the AF coupler 41 is cut off. Thus, the operation ring 4 is manually rotated.

Figure 2:
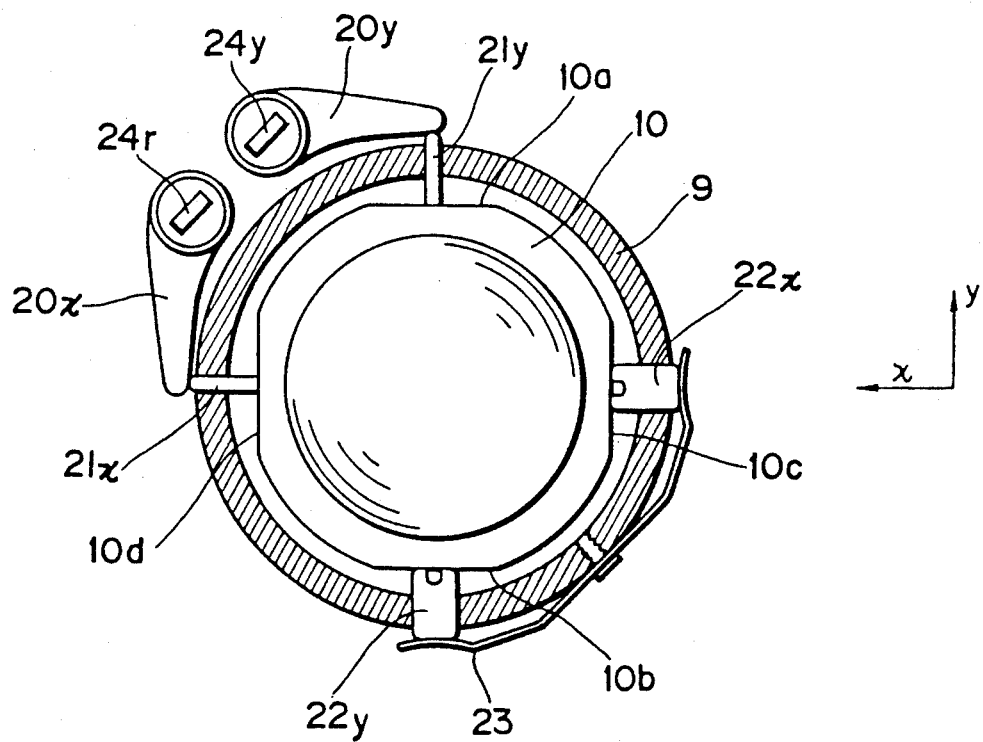
FIG. 2 is a front view showing a vibration compensating driving mechanism according to the embodiment shown in FIG. 1.
Figure 3:
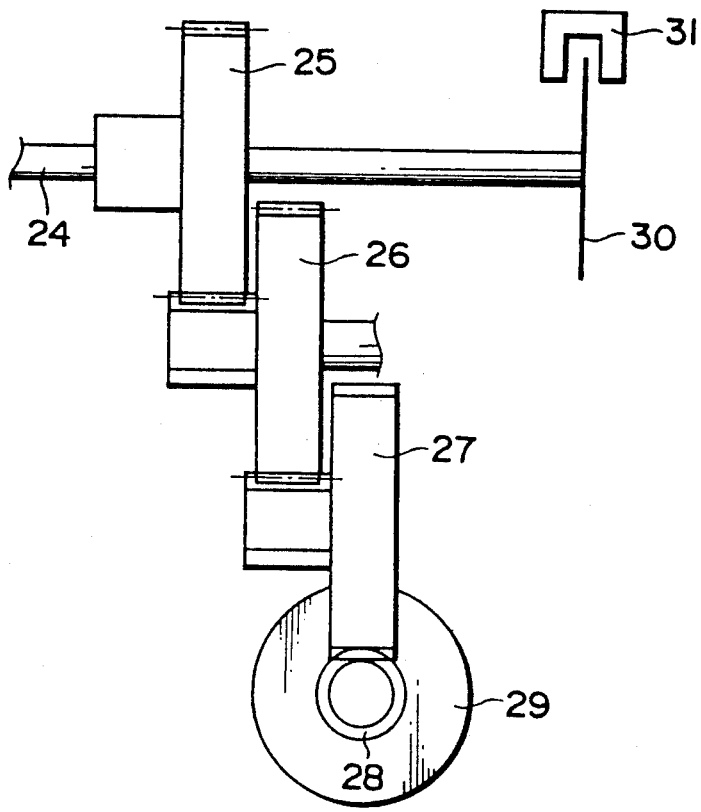
FIG. 3 is a schematic view showing the peripheral portion of the driving means of the vibration compensating driving mechanism according to the embodiment shown in FIG. 1.

FIGS. 1 through 4 show a structure for stabilizing an image in an optical system having a vibration compensating driving mechanism of a lever driving type according to a first embodiment. A frame 10 for holding a compensating lens 11 positioned nearest of all lenses of the group to an object is inserted into the frame 9. The frame 10 is sandwiched between faces 9a and 9b, of the frame 9, perpendicular to the optical axis and opposed to each other. Accordingly, the compensating lens 11 is movable in a direction perpendicular to the optical axis and the movement thereof along the optical axis is restricted. FIG. 2 is a view seen from the object toward the compensating lens 11, the frames 9 and 10, and other mechanisms in the periphery thereof. In the description made below, the vertical direction is y-direction and the horizontal direction is x-direction. Mechanisms in x-direction have x affixed to reference numerals thereof and mechanisms in y-direction have y affixed to reference numerals thereof. The lens frame 10 is provided with pressing pins $21x$ and $21y$ and urging plates $22x$ and $22y$ projecting therefrom in x-direction and y-direction and penetrating radially therethrough. The pins $21x$ and $21y$ and urging plates $22x$ and $22y$ are in contact with the frame 10. The heads of the urging plates $22x$ and $22y$ are pressed by a leaf spring 23 so that they are urged in x-direction and y-direction, respectively. The top portions of the pins $21x$ and $21y$ are pressed by driving levers $20x$ and $20y$ against the urging force of the leaf spring 23. Thus, the frame 10 is positioned. FIG. 3 shows a system comprising a driving motor 29, interlocking gears 25, 26, and 27, a light intercepting plate 30, and a photo-interruptor 31. Each compensating mechanism has this system in x-direction and y-direction. When the driving motor 29 is rotated in one direction, the interlocking lever 24 is rotated in its one direction through the interlocking gears 25, 26, and 27. The interlocking lever 24 engages the driving lever 20, held by the frame 9, in the opening 20a. Therefore, the driving lever 20 is rotated by the rotation of the interlocking lever 24. As a result, the pin 21 is pressed against the leaf spring 23. For example, when the pin $21x$ is pressed against the leaf spring 23, the frame 10 is moved in the x-direction against the urging plate $22x$ and the urging force of the leaf spring 23. At this time, the faces 10a, 10b of the frame 10 with which the pin $21y$ and the urging plate $22y$ are in contact are formed in a plane parallel with the x-direction. Therefore, the frame 10 is allowed to slide in the x-direction. When the driving motor 29 rotates in the other direction, the interlocking lever 29 and the driving lever 20 rotate in the its is other direction. As a result, the frame 10 moves in the x-direction opposite to the direction as described above. A compensating operation in the y-direction is carried out similarly to that in the x-direction. According to the above-described structure for moving the frame 10 in the x-direction and the y-direction, the frame 10 is supported while it is urged by an elastic force in one direction and pressed by a pressing force against the leaf spring 23 in the other direction. Thus, backlashes of gears of a driving force transmitting mechanism can be prevented from occurring. Therefore, there is no play in the compensating operation of the frame 10 which follows the operation of the driving mechanism. Thus, the driving mechanism can perform an operation with a high accuracy.

The driving motor 29 is a pulse motor. As shown in FIG. 3, the rotation of the driving motor 29 is transmitted to the interlocking lever 24 while the rotation is reduced through the interlocking gears 27, 26, and 25. The reduction ratio is set so that the gear 25 does not rotate more than 360° when the frame 10 is moved in the full stroke.

Figures 4A, 4B:
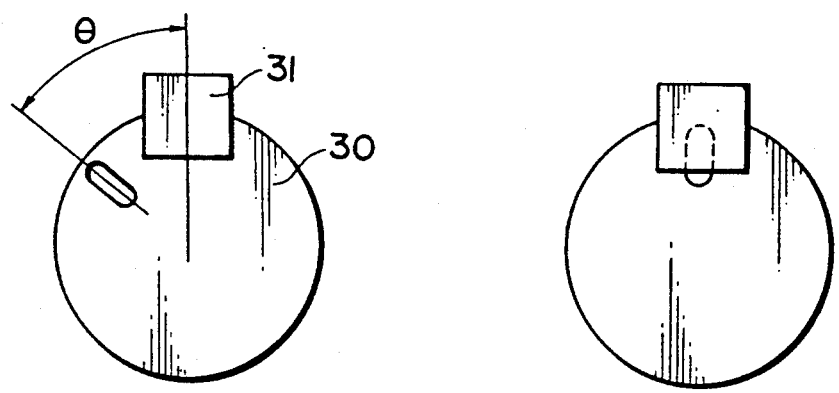
FIGS. 4A and 4B are views for explaining the operation state of a position detecting mechanism in the structure of the peripheral portion of the driving means shown in FIG. 3.

The light intercepting plate 30 is coaxially fixed to the shaft 24 coaxially with the gear 25. The light intercepting plate 30 has one slit. Only when the center of the frame 10 (i.e. the optical axis of the lens 11) aligns with the optical axis, the slit allows a light of the photo-interruptor 31 to pass therethrough while the light intercepting plate 30 is rotating synchronously with the gear 25. As a result, the output of the photo-interruptor 31 can be obtained. Accordingly, in order to return the frame 10 to the initial position at which the compensation amount is 0, the pulse motor 29 is reversely rotated after the frame 10 is driven and the pulse motor 29 is stopped when the output of the photo-interruptor 31 is obtained. FIG. 4A shows a condition in which the position of the slit of the light intercepting plate 30 makes an angle of $\theta$ with the position of the photo-interruptor 31 while FIG. 4B shows a condition in which the slit aligns with the position of the photo-interruptor 31.

Figure 5:
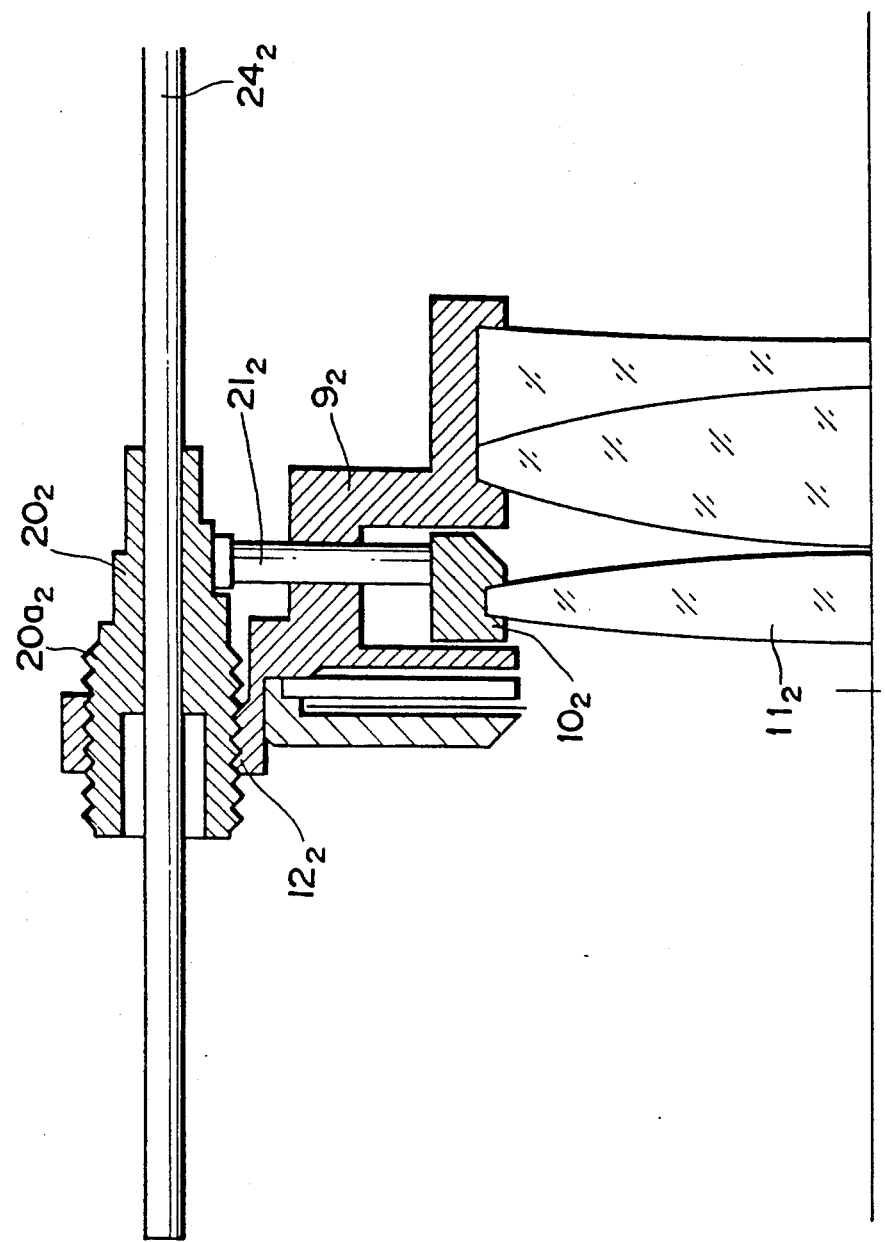
FIG. 5 is a vertical sectional view showing a multi-rotation cam type vibration compensating driving mechanism according to a second embodiment of the present invention.

FIG. 5 shows a vibration compensating driving mechanism of a multi-rotation cam type according to a second embodiment. In the second embodiment, a driving cam $20_2$ rotates together with an interlocking lever $24_2$ and is allowed to slide in the axial direction of the interlocking lever $24_2$. That is, the interlocking lever $24_2$ is straight and has a uniform cross-sectional configuration along its entire axis. The driving cam $20_2$ is axially slidably mounted on the interlocking lever $24_2$. The sectional configuration of the interlocking lever $24_2$ is not circular, but elliptic. Such an assembly comprising an interlocking lever and a driving cam is hereinafter referred to as the oval assembly. The driving cam $20_2$ has a cam profile in which a spiral steps are formed in the periphery of its axis. The radius of the profile is linearly varied along the axis of the driving cam $20_2$. One end of a cam follower $21_2$ is in contact with the cam profile and the other end thereof penetrates through a compensating lens holding frame $9_2$, thus contacting a compensating lens frame $10_2$. The lens frame $10_2$ is urged radially outwards similarly to the first embodiment. A male screw $20_{a2}$ formed on the peripheral surface engages a female screw $12_2$ formed on the peripheral surface of the frame $9_2$. Thus, the driving cam $20_2$ moves along the optical axis due to the rotation of the interlocking lever $24_2$ and the cam follower $21_2$ moves in conformity with the cam profile of the driving cam $20_2$. As a result, the frame $10_2$ moves radially inwards. Thus, the position of the frame $10_2$ is adjusted. The pitch of the male screw $20_{a2}$ is the same as that of the spiral of the cam profile.

Figure 6:
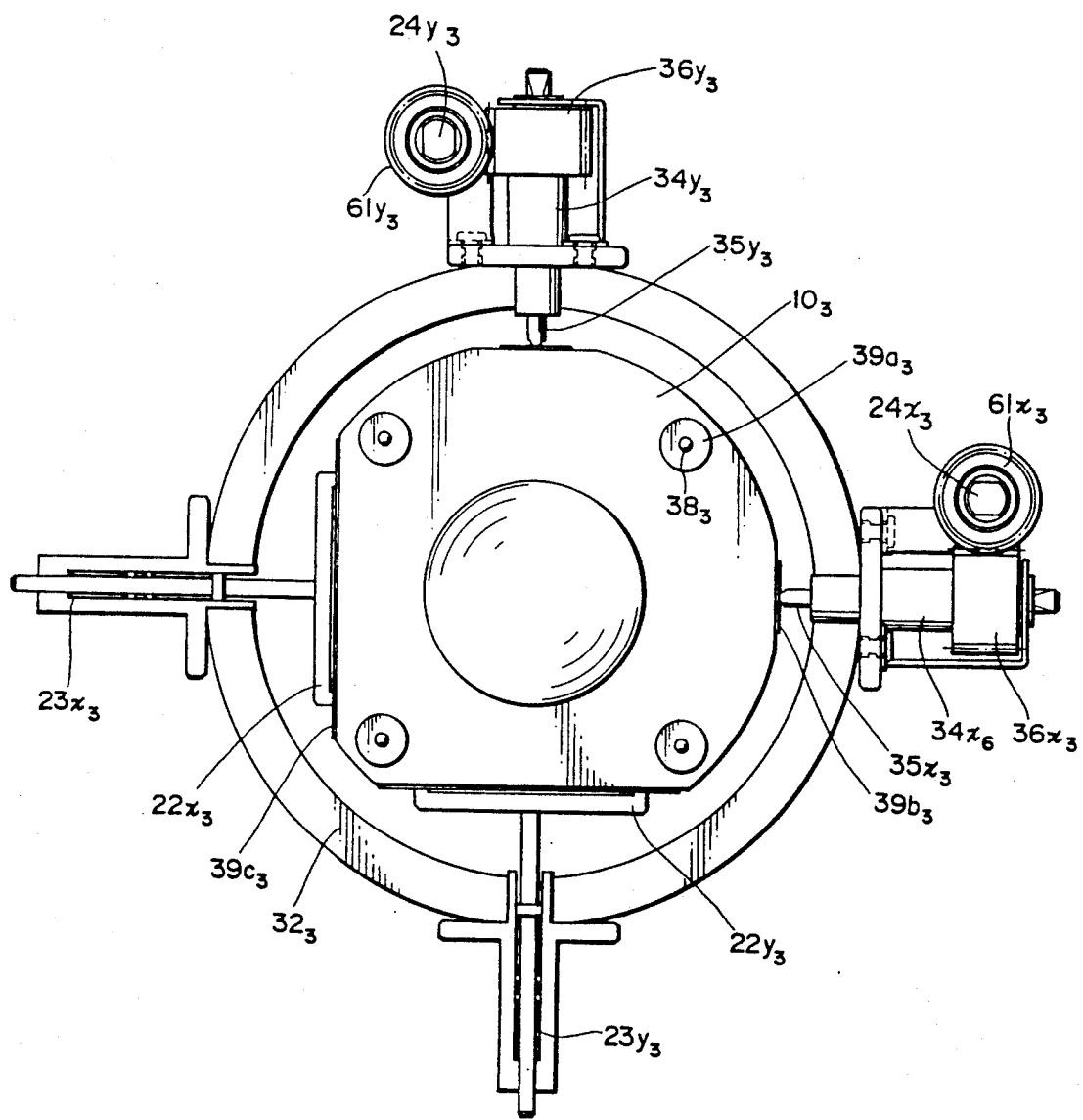
FIG. 6 is a front view showing a screw type vibration compensating driving mechanism according to a third embodiment of the present invention.
Figure 7:
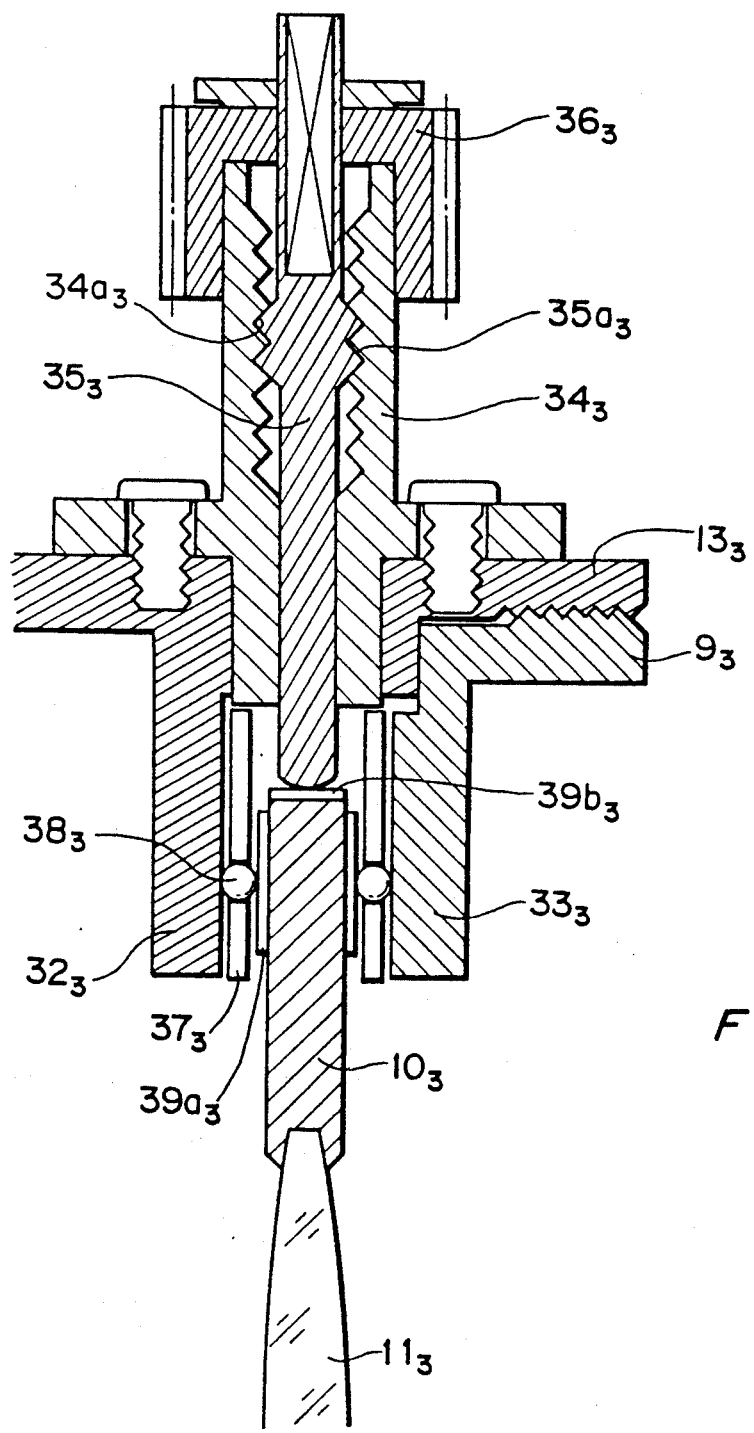
FIG. 7 is a sectional view showing principal portions of FIG. 6.
Figure 8:
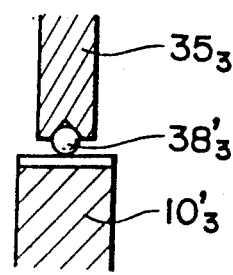
FIG. 8 is a sectional view showing principal portions of a partially modified example of the vibration compensating driving mechanism shown in FIG. 6.
Figure 9:
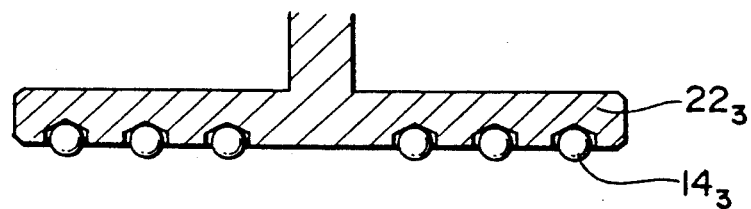
FIG. 9 is a vertical sectional view showing the structure of a steel ball on the side for supporting a compensating lens holding frame in the vibration compensating driving mechanism shown in FIG. 6.
Figure 10:
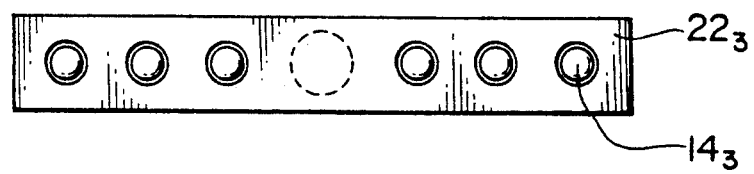
FIG. 10 is a bottom view of FIG. 9.

FIGS. 6 and 7 show a screw type vibration compensating driving mechanism according to a third embodiment. According to the third embodiment, an interlocking lever $24_3$ and a helical gear $61_3$ are assembled according to the oval assembly. A helical gear $36_3$ which converts a rotational direction by 90° is screwed into the gear $61_3$. The axis of the helical gear $36_3$ is perpendicular to the optical axis of the photographing optical system. The helical gear $36_3$ and a driving shaft $35_3$ are assembled according to the oval assembly. A male screw $35_{a3}$ is formed in approximately the center portion of the driving shaft $35_3$. A sleeve $34_3$ surrounds the male screw $35_{a3}$ in such a manner that the male screw $35_{a3}$ is screwed into a female screw $34_{a3}$. The sleeve $34_3$ is fixed to a cover $13_3$ fixed to the upper end of the frame $9_3$. The gear $36_3$ encircles the upper portion of the sleeve $34_3$ so that the former is rotatable independently of the latter. The rotation of the driving motor is transmitted to the interlocking lever $24_3$, the helical gears $61_3$ and $36_3$, and the driving shaft $35_3$. When the driving shaft $35_3$ rotates, it moves in the axial direction of the sleeve $34_3$ with respect to the sleeve $34_3$, thus adjusting the position of the frame $10_3$. The frame $10_3$ is sandwiched between the inner flange $32_3$ of the cover $13_3$ and the inner flange $33_3$ formed on the lower portion of the frame $9_3$. Similarly to the first and other embodiments, the frame $10_3$ is urged radially outwards. Accordingly, the frame $10_3$ may not follow a rapid operation of the driving shaft $35_3$. In order to overcome this problem, the following two points are considered: the weight reductions of the frame $10_3$ and the compensating lens $11_3$, and the increase of force for urging the frame $10_3$. If the urging force is increased, a load is increasingly applied to the driving motor. In order to reduce the weights of the frame $10_3$ and the compensating lens $11_3$, a plastic material is normally used. But the plastic material is susceptible to a friction and a mechanical shock. In view of these problems, according to this embodiment as shown in FIG. 7, a steel ball $38_3$ and metallic sliding plates $39_{a3}$ and $39_{b3}$ are used as the material of places on which the frame $10_3$ slides and other portions are made of plastic materials. Thus, the vibration compensating driving mechanism can be reduced in weight and is durable. Reference numeral $37_3$ denotes the retainer of the steel ball $38_3$. The structure for urging and supporting the frame $10_3$ is as follows: As shown in FIG. 6, faces each parallel with x-direction and y-direction are formed on the portion for supporting the frame $10_3$. An approximately T-shaped urging plate $22_3$ for holding the steel balls $14_3$ arranged along the faces as shown in FIGS. 9 and 10 is used. A compressed coil spring $23_3$ is inserted in the lengthwise portion of the T-shaped urging plate $22_3$. The lower surface of the driving shaft $35_3$ is spherical in this embodiment, however, in order to reduce the friction between the lower surface of the driving shaft $35_3$ and the frame $10_3$, a steel ball $38'_3$ may be provided on the lower end surface thereof as shown in FIG. 8.

Figure 11:
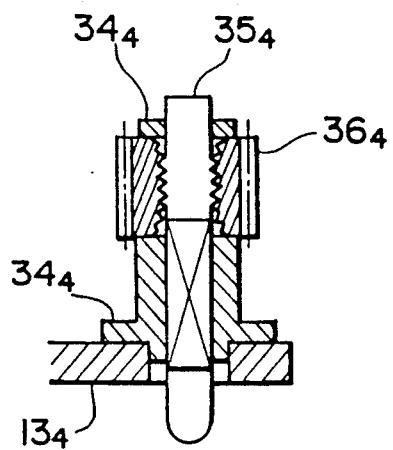
FIG. 11 is a sectional view showing principal portions in which another example of a screw type vibration compensating driving mechanism according to a fourth embodiment of the present invention is shown.

In the above-described third embodiment, the driving shaft $35_3$ moves in the axial direction thereof while it is rotating, however, the following structure as shown in FIG. 11 may be employed as a fourth embodiment. That is, it is possible to move a driving shaft $35_4$ in the axial direction thereof without rotating it. More specifically, the driving shaft $35_4$ is assembled on a sleeve $34_4$ fixed to a cover $13_4$ according to the oval assembly and a helical gear $36_4$ and the driving shaft $35_4$ engage with each other inside the helical gear $36_4$. The helical gear $36_4$ is rotatable independently of the sleeve $34_4$.

Figure 12:
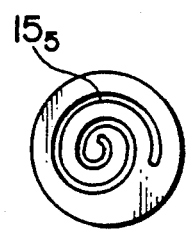
FIG. 12 is a view showing a spiral groove cam type vibration compensating driving mechanism according to a fifth embodiment of the present invention.
Figure 13:
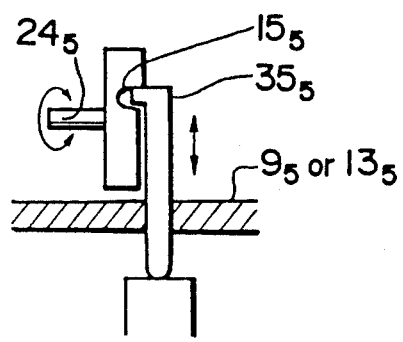
FIG. 13 is a schematic view showing the engagement condition of the groove cam shown in FIG. 12 and a driving shaft.

FIGS. 12 and 13 show a groove cam type vibration compensating driving mechanism according to a fifth embodiment. In this embodiment, a disk having a spiral groove cam $15_5$ is mounted on the top of an interlocking lever $24_5$. The cam profile of the groove cam $15_5$ comprises a spiral groove coaxial with the axis of the interlocking lever $24_5$ and the top end portion of the driving shaft $35_5$ serving as a cam follower engages the cam groove. The other end of the driving shaft $35_5$ is in contact with the frame $10_5$. The driving shaft $35_5$ is allowed to move only in the axial direction thereof in such a manner that the middle portion thereof penetrates through a frame $9_5$ or the cover $13_5$ thereof. Accordingly, when the driving motor is rotated, the interlocking lever $24_5$ and the disk are rotated. As a result, the driving shaft $35_5$ moves in the axial direction thereof due to the engagement between the spiral groove cam $15_5$ and the driving shaft $35_5$. Thus, the position of the frame $10_5$ is adjusted.

Figure 14:
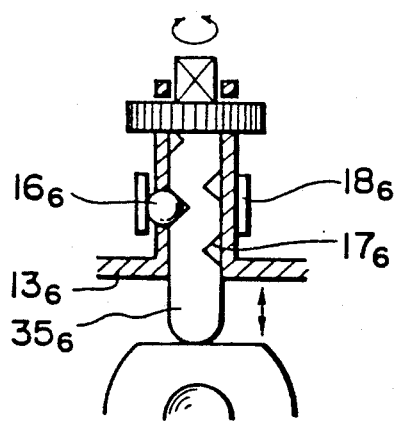
FIG. 14 is a schematic view showing a ball thread type vibration compensating driving mechanism according to a sixth embodiment of the present invention.
Figure 15:
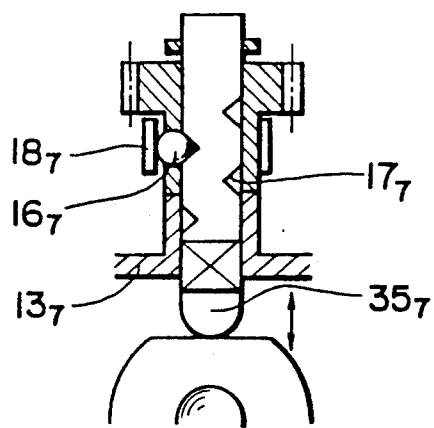
FIG. 15 is a schematic view showing another example of a ball thread type vibration compensating driving mechanism according to a seventh embodiment of the present invention.

FIGS. 14 and 15 show ball thread type vibration compensating driving mechanisms of sixth and seventh embodiments. This type of mechanism can be obtained by either using a ball thread instead of screws in combining the sleeve $34_3$ and the driving shaft $35_3$ with each other in the third embodiment or a ball thread instead of screws in combining the helical gear $36_4$ and the driving shaft $35_4$ with each other in the fourth embodiment. In FIGS. 14 and 15, reference numeral $16_6$ and $16_7$ denote a steel ball, respectively, $17_6$ and $17_7$ designate a spiral V-shaped groove, respectively formed on the peripheral surface of a driving shaft, $18_6$ indicates a spring for pressing the steel ball $16_6$ into the V-shaped groove $17_6$, and $18_7$ also denotes a spring for pressing the steel ball $16_7$ into the V-shaped groove $17_7$. The ball thread type vibration compensating driving mechanisms eliminates the need for a slip structure for protecting it when the driving shaft is pressed to the termination of the driving range thereof.

Figure 16:
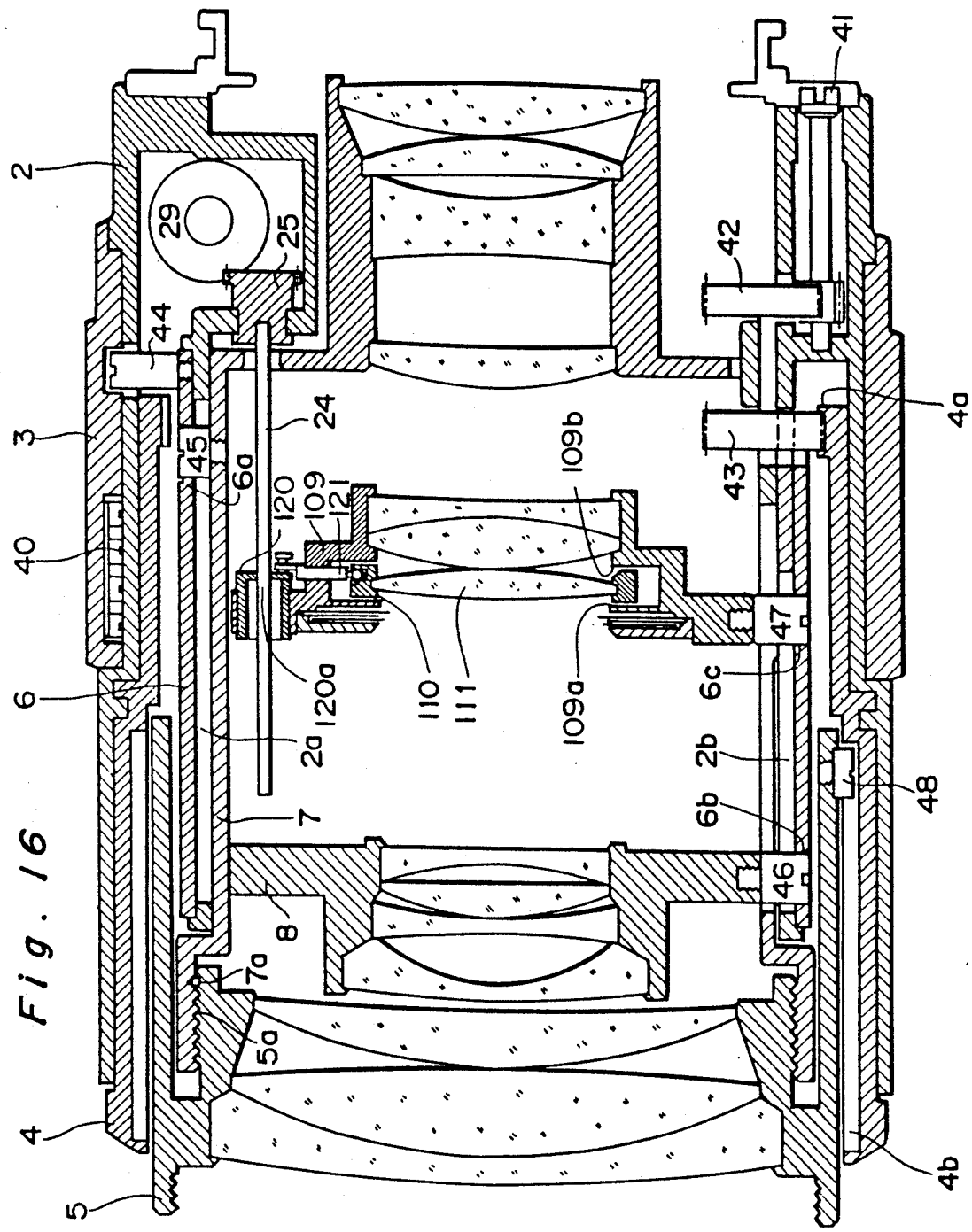
FIG. 16 is a vertical sectional view showing a structure for stabilizing an image for use in an optical system according to an eighth embodiment of the present invention.
Figure 17:
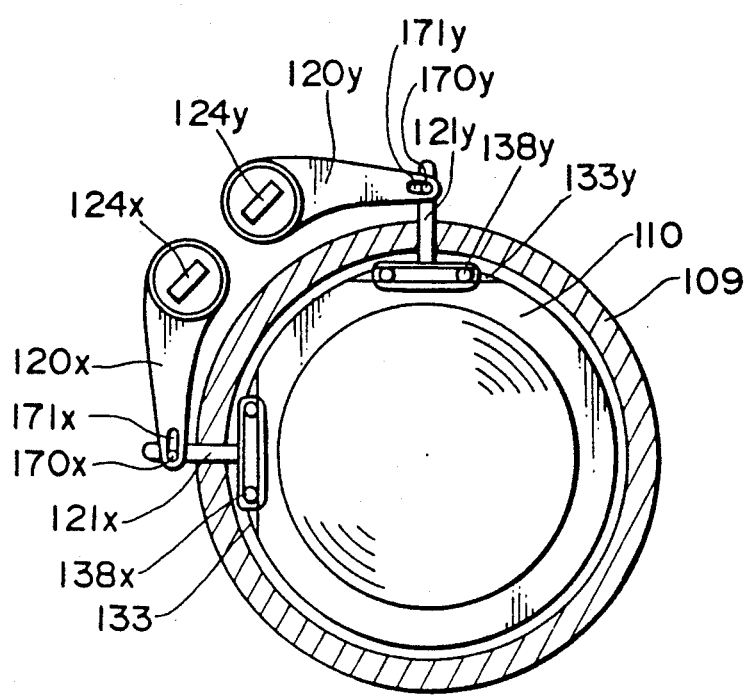
FIG. 17 is a front view showing a vibration compensating driving mechanism shown in the embodiment of the present invention shown in FIG. 16.

FIGS. 16 and 17 show an eighth embodiment. The eighth embodiment is a modification of the first embodiment. FIG. 16 corresponds to FIG. 1 and FIG. 17 correspond to FIG. 2. Therefore, structures of FIGS. 16 and 17 same as those of FIGS. 1 and 2 are designated by the same reference numerals and the descriptions thereof are omitted.

The fundamental structure of each portion of a lens barrel and the operation thereof to be performed when a zooming and a focusing are carried out in this embodiment are the same as that of the first embodiment described with reference to FIG. 2. The driving lever 20 and the rectangular opening 20a of the first embodiment correspond to a modified driving lever 120 and a rectangular opening 120a, respectively. The compensating lens frame 10 and the compensating lens 11 correspond to a frame 110 and a compensating lens 111, respectively.

The frame 110 is moved by driving it in x-direction and y-direction. The force for driving the frame 110 is transmitted thereto from driving levers $120x$ and $120y$ as shown in FIG. 17 through rods $121x$ and $121y$. Approximately T-shaped rods $121x$ and $121y$ are connected to each of the driving levers $120x$ and $120y$ at a lengthwise portion thereof. The widthwise portions of the T-shaped rods $121x$ and $121y$ hold steel balls $138x$ and $138y$ at both ends thereof such that the steel balls $138x$ and $138y$ are rotatable. Each of pins $170x$ and $170y$ projecting from the rods $121x$ and $121y$ is inserted into each of slits $171x$ and $171y$ formed on the driving levers $120x$ and $120y$ so that the rod $121x$ and the driving lever $120x$, and the rod $121y$ and the driving lever $120y$ are connected with each other, respectively. When the distance between each pivotal center of the driving levers $120x$ and $120y$ and each portion thus connected is varied, the pin moves in the slit. Therefore, the rods $121x$ and $121y$ move in the x-direction and the y-direction. In parallel with the widthwise portion of the rods $121x$ and $121y$ holding the steel balls $13_8$, a v-shaped groove $13_3$ into which the steel ball $138$ is inserted is formed at the engaging portions of the frame 110 and the rods $121x$ and $121y$. According to this construction, when the compensating lens 111 is moved in the x-direction, the pivotal motion of the driving lever $120x$ slides the rod $121x$ in the longitudinal direction thereof and the engagement of the steel ball $138x$ and the V-shaped groove $133x$ presses or pulls the frame 110 in the x-direction. At this time, since the steel ball $138y$ held by the rod $121y$ is allowed to move in the V-shaped groove $133y$ in the longitudinal direction (x-direction) thereof, the rod $121y$ does not prevent the frame 110 from moving in x-direction. Similarly to the x-direction movement of the frame 110, the rod $121x$ does not prevent the frame 110 from moving in the y-direction.

The mechanism for transmitting the rotation of the driving motor 29 to the interlocking lever 24 and the mechanism for returning the frame 110 to the initial position at which a compensating amount is 0 are the same as those of the first embodiment described with reference to FIGS. 3 and 4. Since the interlocking lever 124 engages the driving lever 120, rotatably held by the compensating lens holding frame 109, in the opening $120a$, the driving lever 120 rotates together with the interlocking lever 124. As a result, the rod 121 is pressed or pulled.

In this embodiment, since the driving levers $120x$, $120y$ and the rods $121x$, $121y$ for moving the compensating lens 111 are mounted on the frame 109 which moves together with other lens groups, the construction of the driving force transmitting system can be simplified. Consequently, an accurate driving system having very few backlashes can be obtained and the number of parts is small because interlocking parts are unnecessary.

FIGS. 18, 19A and 19B show a screw type vibration compensating driving mechanism according to a ninth embodiment. In the ninth embodiment, driving force of a driving motor is transmitted to a gear $134_9$ through a driving force transmitting system (not shown) such as a gear train. A driving shaft $135_9$ is combined with the gear $134_9$ according to the oval assembly. A female screw $135_{a9}$ is formed in approximately the center of the driving shaft $135_9$. A sleeve $136_9$ is connected with the driving shaft $135_9$ through the engagement of the female screw $135_{a9}$ and a female screw $136_{a9}$. The sleeve $136_9$ is fixed to a cover $137_9$ fixed to the end portion of the compensating lens holding frame $9_9$. The top of the sleeve $136_9$ is inserted into the gear $134_9$ such that the gear $134_9$ is rotatable independently of the sleeve $136_9$. A steel ball holder $139_9$ rotatable about the axis of the driving shaft $135_9$ is mounted on the lower end thereof. The driving shaft $135_9$ and the steel ball holder $139_9$ are rotatable independently of each other. When the rotation of the latter is restrained, the former is rotatable. Accordingly, the driving shaft $135_9$ rotates together with the gear $134_9$ and the driving shaft $135_9$ moves because the driving shaft $135_9$ and the sleeve $136_9$ are combined with each other with the screws $135_{a9}$ and $136_{a9}$, however, the steel ball holder $139_9$ does not rotate and is capable of moving in the axial direction of the driving shaft $135_9$ with the movement thereof. The steel ball holder $139_9$ engages the frame $110_9$ while it holds the steel ball $138_9$ at its top end thereof. A guide plate $132_9$ having a V-shaped groove $133_9$ as shown in FIG. 19 is mounted on the portion at which the steel ball holder $139_9$ is in engagement with the frame $110_9$. The steel ball holder $139_9$ and the frame $110_9$ are connected to each other by the engagement of the steel ball $138_9$ with the V-shaped groove $133_9$. The V-shaped groove $133_9$ allows the steel ball $138_9$ to move in x-direction or y-direction in the longitudinal direction thereof and prevents it from moving in a direction perpendicular thereto, namely, in the direction in which the driving shaft $135_9$ moves. A steel ball $150_9$ shown in FIG. 18 allows the frame $110_9$ to move smoothly with a small amount of frictional resistance and prevents it from being shaken. Reference numeral $151_9$ denotes a retainer for retaining the steel ball $150_9$, and $152_9$ indicates a metallic sliding plate.

Figure 20:
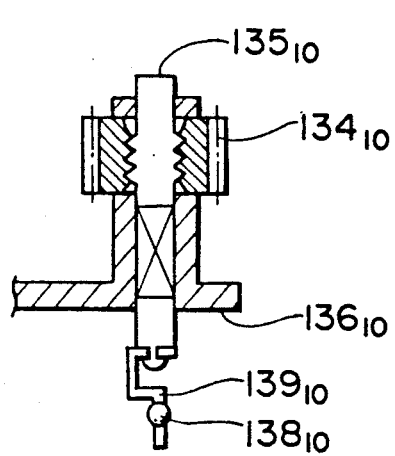
FIG. 20 is a schematic view showing another example of a screw type vibration compensating driving mechanism according to a tenth embodiment of the present invention.

In the ninth embodiment, the driving shaft $135_9$ moves in the axial direction thereof while it is rotating. But in a tenth embodiment which is shown in FIG. 20, in the case of screw type vibration compensating driving mechanism, it is possible to move the driving shaft $135_9$ in the axial direction thereof without rotating it. More specifically, a driving shaft $135_{10}$ is combined with a sleeve $136_{10}$ according to the oval assembly. A gear $134_{10}$ engages the driving shaft $135_{10}$ through screws in the gear $134_{10}$. The gear $134_{10}$ is rotatable independently of the sleeve $136_{10}$. According to this construction, since the driving shaft $135_{10}$ moves in the axial direction thereof without rotating, a steel ball holder $139_{10}$ attached to the lower end of the driving shaft $135_{10}$ may be fixed thereto.

Figure 22:
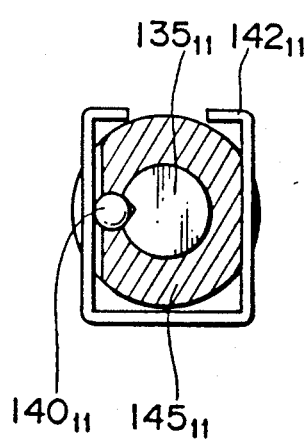
FIG. 22 is a view taken along the line XXII—XXII of FIG. 21.
Figure 21:
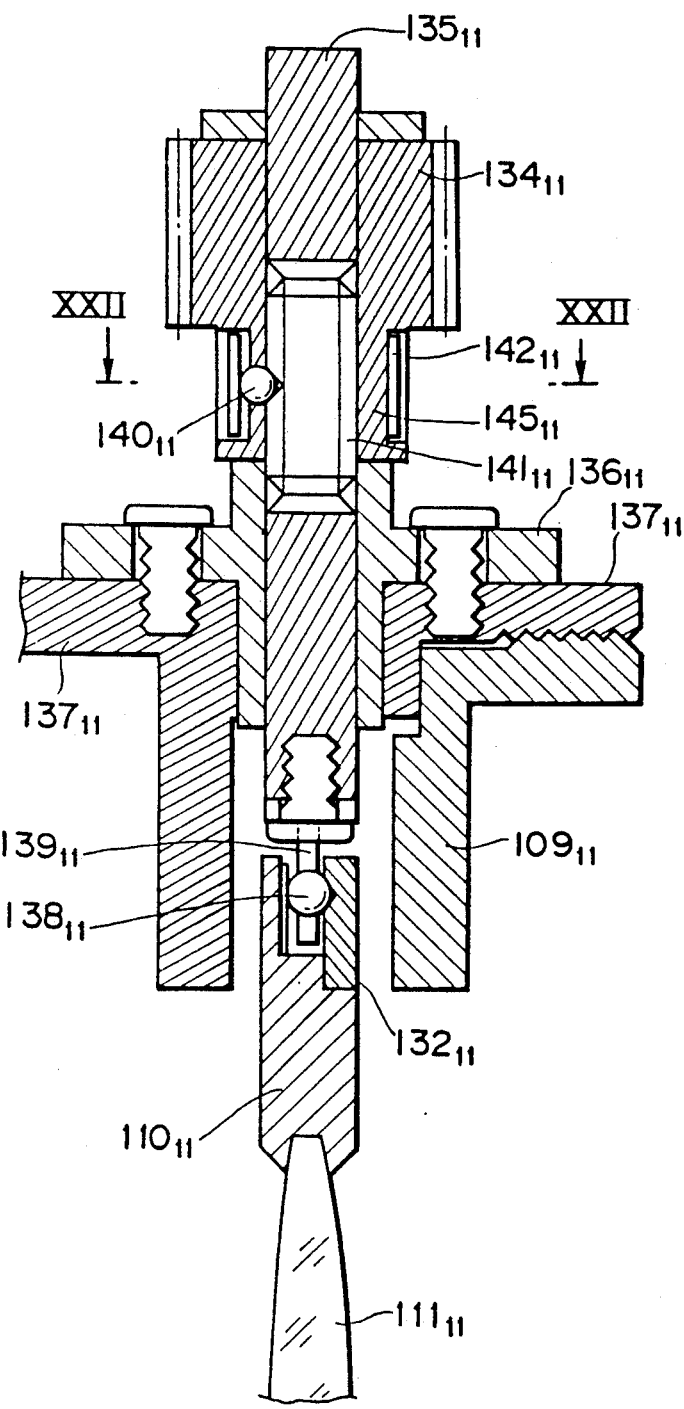
FIG. 21 is a vertical sectional view showing a ball thread type vibration compensating driving mechanism according to an eleventh embodiment of the present invention.
Figure 23:
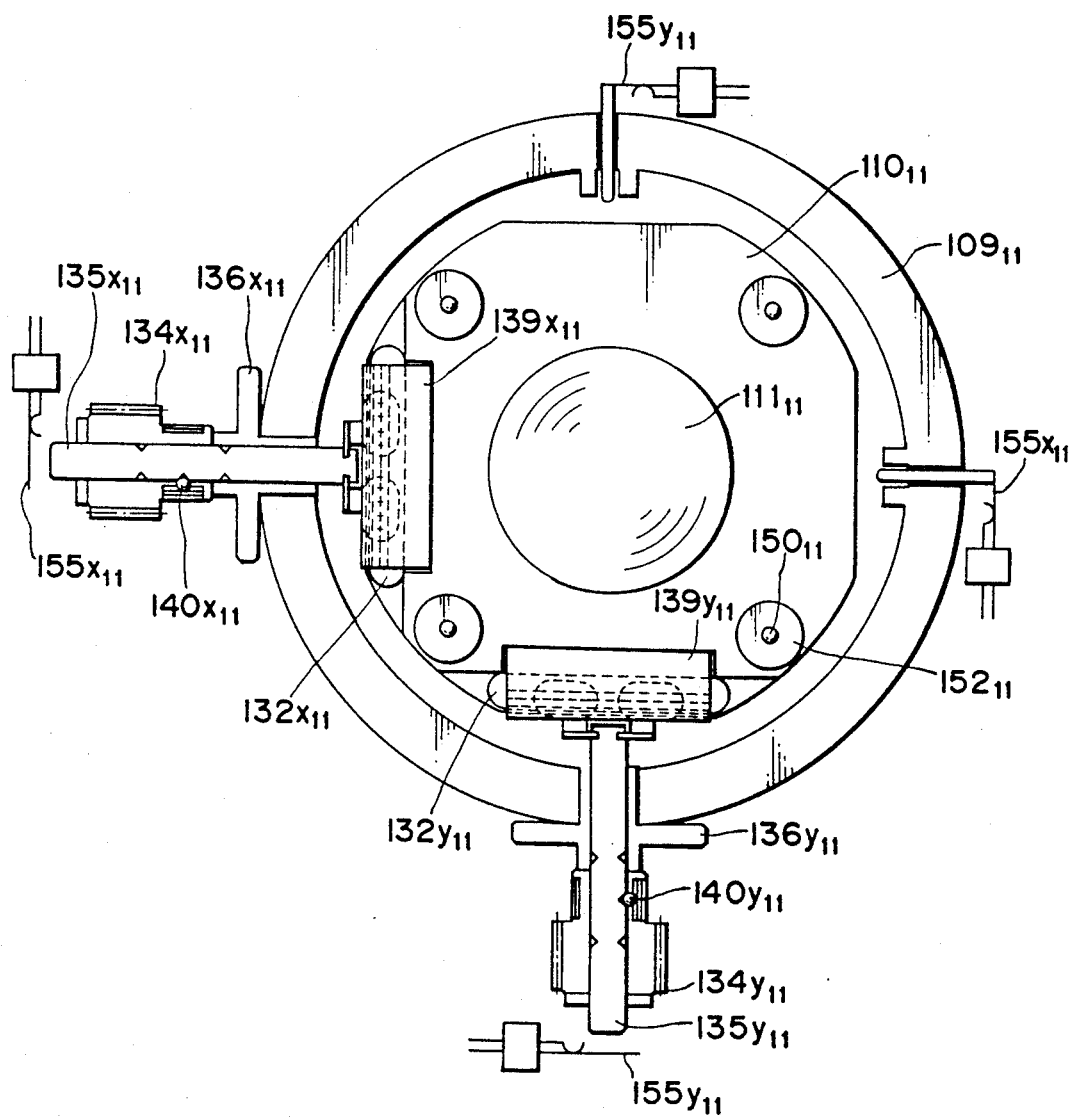
FIG. 23 is a front view showing another example of a ball thread type vibration compensating driving mechanism according to the eleventh embodiment of the present invention.

FIGS. 21, 22 and 23 show a ball thread type vibration compensating driving mechanism according to a ninth embodiment. In the eleventh embodiment, driving force of a driving motor is transmitted to a gear $134_{11}$ through a driving force transmitting system (not shown) such as a gear train. A holding portion $145_{11}$ extends downward from the lower portion of the gear $134_{11}$, thus holding a steel ball $140_{11}$. A thread groove $141_{11}$ which engages the steel ball $140_{11}$ is formed on approximately the center of the peripheral surface of the driving shaft $135_{11}$. As shown in FIG. 22, a clip $142_{11}$ elastically presses the steel ball $140_{11}$ against the thread groove $141_{11}$. The driving shaft $135_{11}$ and the sleeve $136_{11}$ are combined with each other according to the oval assembly. When the gear $134_{11}$ is rotated, the holding portion $145_{11}$ rotates together therewith while the holding portion $145_{11}$ holds the steel ball $140_{11}$, and the driving shaft $135_{11}$ combined with the steel ball $140_{11}$ through the thread groove $141_{11}$ moves in the axial direction thereof. The driving shaft $135_{11}$ moves by one pitch of the thread groove $141_{11}$ per rotation of the gear $134_{11}$, thus moving the compensating lens frame $110_{11}$. Since the driving shaft $135_{11}$ does not rotate, the steel ball holder $139_{11}$ may be fixed to the driving shaft $135_{11}$ similarly to the tenth embodiment. Referring to FIG. 23, reference numeral $155_{11}$ denotes a limit switch, $150_{11}$ designates a steel ball, and $152_{11}$ indicates a metallic sliding plate.

Figure 24:
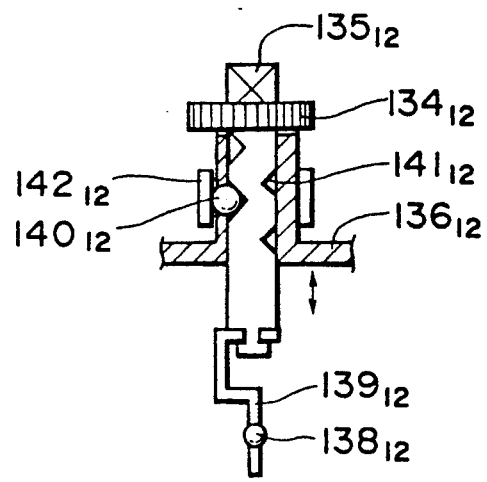
FIG. 24 is a schematic view showing still another example of a ball thread type vibration compensating driving mechanism according to a twelfth embodiment of the present invention.

In the eleventh embodiment, the driving shaft $135_{11}$ does not rotate will it is moving in the axial direction thereof. But in a twelfth embodiment shown in FIG. 24, in the case of a ball thread type vibration compensating driving mechanism, it is possible to move the driving shaft $135_{12}$ in the axial direction while it is rotating. More specifically, a gear $134_{12}$ and a driving shaft $135_{12}$ are combined with each other according to the oval assembly and a steel ball $140_{12}$ held by a sleeve $136_{12}$ is screwed into a thread groove $141_{12}$ of the driving shaft $135_{12}$. The driving shaft $135_{12}$ rotates together with the gear $134_{12}$, and the driving shaft $135_{12}$ moves by one pitch of the thread groove $141_{12}$ per rotation of the gear $134_{12}$, thus moving the compensating lens frame $110_{12}$. According to this construction, since the driving shaft $135_{12}$ moves in the axial direction while it is rotating, a steel ball holder $139_{12}$ attached to the lower end thereof is rotatable about the axis of the driving shaft $135_{12}$ similarly to the ninth embodiment. Reference numeral $142_{12}$ denotes a clip for elastically holding the steel ball $140_{12}$ by pressing it against the thread groove $141_{12}$.

In the ball thread type vibration compensating driving mechanism according to the eleventh and twelfth embodiments, the thread grooves $141_{11}$ and $141_{12}$ of each of the driving shafts $135_{11}$ and $135_{12}$ form circumferential grooves at both ends of the driving shafts $135_{11}$ and $135_{12}$ due to a manufacturing process. According to this structure, when the driving shafts $135_{11}$ and $135_{12}$ are pressed to both terminations of the moving range thereof, the steel balls $140_{11}$ and $140_{11}$ circle round the driving shafts $135_{11}$ and $135_{12}$ along the circumferential groove. Therefore, it is unnecessary to provide the driving mechanism with a slip structure for protecting it in case the compensating lens frame $110_{11}$ and $110_{12}$ are stopped whereas the slip structure is provided on a driving mechanism other than the ball thread type. The torque required for the steel ball $140_{11}$ and $140_{12}$ to circle round the driving shafts $135_{11}$ and $135_{12}$, respectively can be set by approximately selecting the spring strength of the clip $142_{11}$ and $142_{12}$ which press the steel ball $140_{11}$ and $140_{12}$ against the driving shaft $135_{11}$ and $135_{12}$, respectively. The driving shafts $135_{11}$ and $135_{12}$ move in the range between the upper and lower ends of the thread grooves $141_{11}$ and $141_{12}$ excluding the circumferential grooves at both ends of the driving shafts $135_{11}$ and $135_{12}$. Except for the above-described structure of the circumferential grooves at both ends of the driving shafts, this embodiment is the same as the screw type vibration compensating driving mechanism of the ninth and tenth embodiments.

Figure 25:
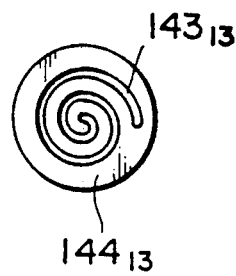
FIG. 25 is a view showing a spiral groove cam type vibration compensating driving mechanism according to a thirteenth embodiment of the present invention.
Figure 26:
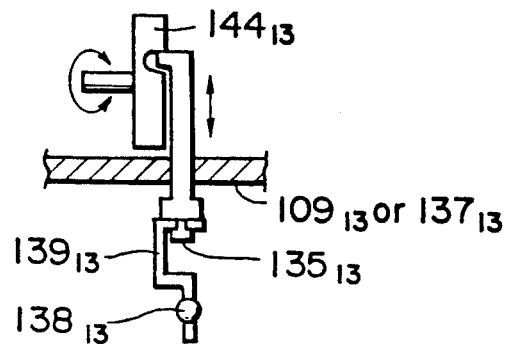
FIG. 26 is a schematic view showing the engagement condition of the groove cam shown in FIG. 25 and a driving shaft.

FIGS. 25 and 26 show a groove cam type vibration compensating driving mechanism according to a thirteenth embodiment. A disk $144_{13}$ having a spiral groove cam $143_{13}$ is used in this embodiment. The cam profile of the groove cam $143_{13}$ comprises a spiral groove coaxial with the axis of the disk $144_{13}$. The top end portion of a driving shaft $135_{13}$ serving as a cam follower engages the groove cam $143_{13}$. The other end of the driving shaft $135_{13}$ is in contact with a compensating lens frame $110_{13}$. The driving shaft $135_{13}$ is allowed to move only in the axial direction thereof such that the middle portion thereof penetrates through the compensating holding frame $109_{13}$ or the cover $137_{13}$ thereof. Accordingly, the disk $144_{13}$ is rotated by the driving force of the motor, and the driving shaft $135_{13}$ moves in the axial direction thereof due to the engagement of the spiral groove cam $143_{13}$ and the driving shaft $135_{13}$. Thus, the position of the compensating lens frame $110_{13}$ is adjusted.

Figure 27:
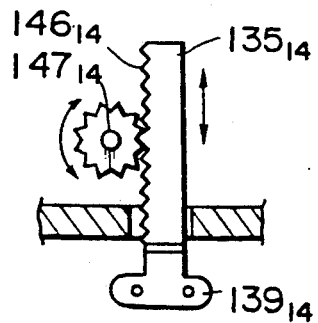
FIG. 27 is a schematic side elevational view showing a rack pinion type vibration compensating driving mechanism according to a fourteenth embodiment of the present invention.
Figure 28:
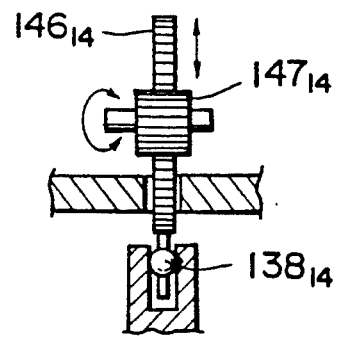
FIG. 28 is a schematic front view showing the fourteenth embodiment shown in FIG. 27.

FIGS. 27 and 28 show a rack pinion type vibration compensating driving mechanism according to a fourteenth embodiment. In this embodiment, a rack $146_{14}$ formed on a driving shaft $135_{14}$ engages a pinion $147_{14}$. The pinion $147_{14}$ is driven by a driving motor, thus moving the driving shaft $135_{14}$ in the axial direction thereof.

Figure 29:
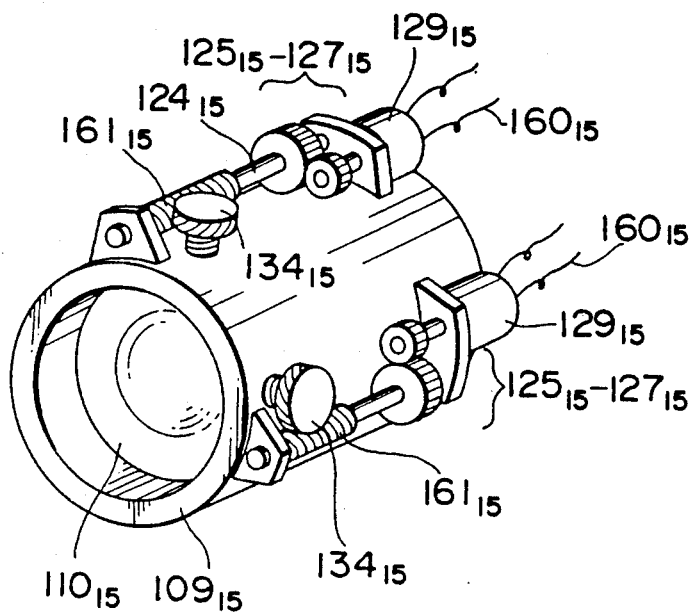
FIG. 29 is a perspective view showing the structure of a driving motor and a driving force transmitting system according to a fifteenth embodiment of the present invention.

FIG. 29 is a perspective view showing a vibration compensating driving mechanism according to a fifteenth embodiment comprising a driving motor and a driving force transmitting system. In this embodiment, a pulse motor $129_{15}$ is mounted on a compensating lens holding frame $109_{15}$. When a zooming or a focusing is carried out, the pulse motor $129_{15}$ and the lens holding frame $109_{15}$ move together along the optical axis. Accordingly, in the fifteenth embodiment, in order to electrically connect the pulse motor $129_{15}$ and a fixed cylinder (not shown) to each other with a conductive means $160_{15}$ even when the pulse motor $129_{15}$ moves, a flexible conductive means $160_{15}$ is used. The contact range of the contacts thereof covers the movable range of the pulse motor $129_{15}$ or comprises a flexible wire. Gears $134_{15}$ and $161_{15}$ are helical gears. The driving force is transmitted from the pulse motor $129_{15}$ to the gear $134_{15}$ through interlocking gears $125_{15}$-$127_{15}$, an interlocking lever $124_{15}$, and a gear $161_{15}$.

Figure 30:
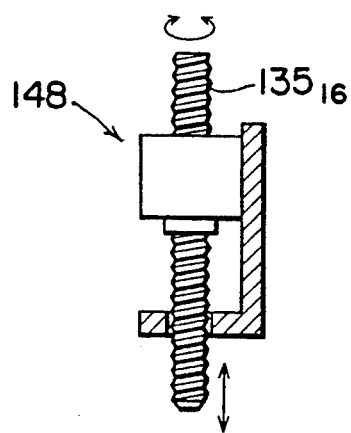
FIG. 30 is a schematic view showing a direct driving type vibration compensating driving mechanism according to a sixteenth embodiment of the present invention.

FIG. 30 shows a direct driving type vibration compensating driving mechanism according to a sixteenth embodiment. In this embodiment, an actuator 148 having a rotor shaft $135_{16}$ composed of a screw is used and the compensating lens frame (not shown) is driven by the movement of the rotor shaft $135_{16}$ in the axial direction directly.

It goes without saying that alterations of structures of each portion may be carried out among the above-described embodiments.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A structure for stabilizing an image for use in an optical system, comprising:
    a lens unit movably provided in said optical system;
    first urging means for urging said lens unit in one direction intersecting an optical axis of said optical system;
    second urging means for urging said lens unit in another direction intersecting the optical axis;
    first guiding means for guiding a movement of said lens unit in said one direction;
    second guiding means for guiding a movement of said lens unit in said another direction;
    first depressing means for depressing said lens unit against the urging force of said first urging means in response to a detection of a vibration of said optical system;
    second depressing means for depressing said lens unit against the urging force of said second urging means in response to a detection of a vibration of said optical system; and
    means, provided in said lens unit, for allowing said movements of said lens unit in said two directions independently of each other.

2. A structure as stated in claim 1, wherein said allowing means includes a first driven surface elongated along said one direction and depressed by said second depressing means and a second drive surface elongated along said another direction and depressed by said first depressing means.

3. A structure as stated in claim 1 further comprising means for restricting a movement of said lens unit in a direction along the optical axis.

4. A structure for stabilizing an image for use in an optical system, comprising:
 a lens unit movably provided in said optical system;
 a holding means for movably holding said lens
 first urging means, provided on said holding means, for urging said lens unit in one direction intersecting an optical axis of said optical system;
 second urging means, provided on said holding means, for urging said lens unit in another direction intersecting the optical axis;
 first guiding means for guiding a movement of said lens unit in said one direction;
 second guiding means for guiding a movement of said lens unit in said another direction;
 first depressing means for depressing said lens unit against an urging force of said first urging means in response to a detection of a vibration of said optical system; and
 second depressing means for depressing said lens unit against an urging force of said second urging means in response to a detection of a vibration of said optical system.

5. A structure as stated in claim 4 further comprising means for allowing said movements of said lens unit in said two directions independently of each other.

6. A structure as stated in claim 5, wherein said allowing means includes a first driven surface elongated along said one direction and depressed by said second depressing means and a second driven surface elongated along said another direction and depressed by said first depressing means.

7. A structure as stated in claim 4, further comprising for restricting a movement of said lens unit in a direction along the optical axis.

8. A structure for stabilizing an image for use in an optical system having a plurality of lens units along an optical axis, comprising:
 a lens unit movably provided in said optical system relative to the other lens units in a direction off of the optical axis;
 a first member stationarily provided in said optical system;
 a second member, provided in said optical system, for holding said lens unit at a neutral position and mounting said lens unit so that it can move in two different directions within a surface intersecting an optical axis of said optical system;
 producing means, provided on said first member, for producing a power for driving said lens unit in the two directions in response to a detection of a vibration of said optical system, and
 an urging means for urging said lens unit against the driving power produced from said producing means so as to return said lens unit to the neutral position.

9. A structure for stabilizing an image for use in an optical system, comprising:
 a lens unit movable provided in said optical system;
 a first member stationarily provided in said optical system;
 a second member, provided in said optical system, for holding said lens unit at its neutral position and allowing said lens unit to move in two different directions within a surface intersecting an optical axis of said optical system;
 producing means, provided on said first member, for producing a power for driving said lens unit in the two directions in response to a detection of a vibration of said optical system, and
 means provided in said lens unit, for allowing a movement of said lens unit in the two directions independently of each other.

10. A structure for stabilizing an image for use in a phototaking lens of a camera comprising:
 a lens unit movably provided in said phototaking lens;
 a first member stationarily provided in said phototaking lens;
 a second member, provided in said phototaking lens, for holding said lens unit at its neutral position and allowing said lens unit to move in two different directions within a surface intersecting an optical axis of said phototaking lens, and
 a driving motor, provided on said first member, for driving said lens unit in the two directions in response to a detection of a vibration of said phototaking lens.

11. A structure as stated in claim 10, further comprising an urging means for urging said lens unit against the driving power produced by said driving motor so as to return said lens unit to the neutral position.

12. A structure as stated in claim 10, further comprising means, provided in said lens unit, for allowing a movement of said lens unit in the two directions independently of each other.

13. A structure for stabilizing an image for use in an optical system, comprising:
 a lens unit movably provided in said optical system;
 driving means for driving said lens unit in response to a detection of a vibration of said optical system;
 supporting means for supporting said lens unit to allow a movement thereof, wherein said supporting means includes means for mechanically smoothing the movement of said lens unit.

14. A structure as stated in claim 13, wherein said smoothing means includes a guiding plate made of metal and a ball made of metal for moving on a surface of said plate.

15. A structure for stabilizing an image for use in a photo-taking lens of a camera composed of plural lens units comprising:
 a lens unit movable in two different directions within a surface intersecting an optical axis of said phototaking lens, wherein said lens unit is located near an aperture;
 producing means for producing a power for driving said lens unit in the two different directions;
 supporting means for supporting said lens unit to allow a movement thereof, wherein said supporting means is movable along the optical axis;
 a first mechanism, provided on said supporting means, for moving said lens unit mechanically by using the driving power produced from said producing means in response to a detection of a vibration of the photo-taking lens; and
 a second mechanism for moving said supporting means mechanically along the optical axis.

16. A structure as stated in claim 15, wherein said second mechanism includes a cam and a cam follower.

17. In an optical system, having a plurality of lens units along an optical axis for stabilizing an image from external vibration, the improvement comprising:

a lens unit provided, in the optical system, for movement in directions off of the optical axis relative to the other lens units;

mounting means for mounting the lens unit for movement in a plurality of directions off of the optical axis including a first force transmitting member mechanically transmitting a force along a first direction to the lens unit and a second force transmitting member mechanically transmitting a force along a second direction, different than the first direction to the lens unit, and means for selectively driving the first and second force transmitting member to compensate for external vibrations.

18. The optical system of claim 17, wherein the mounting means is movable along the optical axis.

19. The optical system of claim 17, wherein the optical system is a zoom lens system for phototaking.

20. The optical system of claim 17, wherein biasing means are provided to provide a counter force relative to each of the force transmitting members on the respective opposite sides of the lens unit.

* * * * *